(12) United States Patent
Macdonald et al.

(10) Patent No.: US 9,496,094 B2
(45) Date of Patent: Nov. 15, 2016

(54) NANOSTRUCTURED ELECTRODES, METHODS OF MAKING ELECTRODES, AND METHODS OF USING ELECTRODES

(71) Applicant: Vanderbilt University, Nashville, TN (US)

(72) Inventors: Janet Macdonald, Nashville, TN (US); Shane Thomas Finn, Nashville, TN (US)

(73) Assignee: VANDERBILT UNIVERSITY CENTER FOR TECHNOLOGY TRANSFER AND COMMERCIALIZATION, Nashville, TN (US)

( * ) Notice: Subject to any disclaimer, the term of this patent is extended or adjusted under 35 U.S.C. 154(b) by 193 days.

(21) Appl. No.: 14/187,371

(22) Filed: Feb. 24, 2014

(65) Prior Publication Data

US 2014/0238480 A1 Aug. 28, 2014

Related U.S. Application Data

(60) Provisional application No. 61/768,678, filed on Feb. 25, 2013.

(51) Int. Cl.
*H01G 9/20* (2006.01)
*B82Y 40/00* (2011.01)
*B82Y 30/00* (2011.01)

(52) U.S. Cl.
CPC ............ *H01G 9/2022* (2013.01); *B82Y 30/00* (2013.01); *B82Y 40/00* (2013.01); *H01G 9/2018* (2013.01); *H01G 9/2031* (2013.01); *Y02E 10/542* (2013.01); *Y10S 977/813* (2013.01); *Y10S 977/896* (2013.01); *Y10S 977/948* (2013.01)

(58) Field of Classification Search
CPC ............ H01G 9/2022; H01G 9/2031; H01G 9/2018; B82Y 40/00; B82Y 30/00
See application file for complete search history.

(56) References Cited

U.S. PATENT DOCUMENTS 4,237,204 A 12/1980 Thompson et al.

OTHER PUBLICATIONS

Li et al. ("MoS2 nanoflowers and their field-emission properties"); Appl. Phys. Lett., vol. 82, No. 12, 24 Mar. 2003.*
Wu et al. ("Preparation of MoS2 nanoflakes by a novel mechanical activation method"); Journal of Crystal Growth; 312 (2010) 340-343.*
Li et al. ("Electrochemical lithiation/delithiation performances of 3D flowerlike MoS2 powders prepared by ionic liquid assisted hydrothermal route"; Journal of Alloys and Compounds; 471 (2009) 442-447.*
Wanzhen Huang, et al.; Tungstenic acid induced assembly of hierarchical flower-like MoS2 spheres; Materials Research Bulletin 43; 2008; 7 pages.

(Continued)

*Primary Examiner* — Christina Chern
(74) *Attorney, Agent, or Firm* — Thomas Horstemeyer, LLP

(57) ABSTRACT

Embodiments of the present disclosure provide for electrodes, devices including electrodes, methods of making electrodes, and the like. In an embodiment, the electrode includes $MoS_2$, in particular, $MoS_2$ nanostructures (e.g., $MoS_2$ nano-petals). Embodiments of the present disclosure can be used in lithium ion batteries, quantum dot sensitized solar cells, dye sensitized solar cells, thin film photovoltaics, and the like.

5 Claims, 6 Drawing Sheets

(56) References Cited

OTHER PUBLICATIONS

Chia-Jui Liu, et al.; Facile synthesis of MoS2/graphene nanocomposite with high catalytic activity toward triodide reduction in dye-sensitized solar cells; Journal of Materials Chemisty; 2012; 8 pages.

Tianxi Wang, et al.; Synthesis of MoS2 and Mo03 hierarchical nanostructures using a single-source molecular precursor; Powder Technology; 2013; 5 pages.

Desheng Kong, et al; Synthesis of MoS2 and MoSe2 Films with Vertically Aligned Layers; Nano Letters; 2013; 7 pages.

Lina Ye, et al; MoS2 hierarchical hollow cubic cages assembled by bilayers: one-step synthesis and their electrochemical hydrogen storage properties; Chem. Commun.; 2006; 3 pages.

Jakob Kibsgaard, et al.; Engineering the surface structure of MoS2 to preferentially expose active edge sites for electrocatalysis; Natural materials; 2012; 7 pages.

* cited by examiner

NANOSTRUCTURED ELECTRODES, METHODS OF MAKING ELECTRODES, AND METHODS OF USING ELECTRODES

CLAIM OF PRIORITY TO RELATED APPLICATION

This application claims priority to U.S. provisional application entitled "NANOSTRUCTURED ELECTRODES, METHODS OF MAKING ELECTRODES, AND METHODS OF USING ELECTRODES" having Ser. No. 61/768,678, filed on Feb. 25, 2013, which is entirely incorporated herein by reference.

STATEMENT REGARDING FEDERALLY SPONSORED RESEARCH OR DEVELOPMENT

This invention(s) was made with government support under Grant No.: EPS-1004083 awarded by the National Science Foundation. The government has certain rights in the invention(s).

BACKGROUND

Quantum dot sensitized solar cells (QDSSCs) are a widely studied system for harvesting light and converting it to electrical energy. The distinguishing quality of QDSSCs in the realm of solar energy conversion is that quantum dots (QDs)—typically CdS or CdSe—are the light absorbing component instead of dyes or silicon. QDs are an attractive photoabsorber because their energy of absorption in the visible region can be tuned based on their size and because they have large absorption coefficients. Great strides are being made into developing new, more efficient absorber layers on the photoanode; however, instability of the cathode material prevents these cells from working effectively. The QDSSC photoanode is and has been extensively studied but the cathode has not. As a consequence, there is a need to develop cathodes for this technology.

SUMMARY

Embodiments of the present disclosure provide for electrodes, devices including electrodes, methods of making electrodes, and the like. In an embodiment, a device can include: an anode, an electrolyte, and a $MoS_2$ cathode. In an illustrative embodiment, the $MoS_2$ cathode includes $MoS_2$ nano-petals on the surface of the cathode, and specifically, where edges of the $MoS_2$ nano-petals can be substantially perpendicular to the surface of the $MoS_2$ cathode. An embodiment of the electrolyte can include: a polysulfide electrolyte, an acidic or basic electrolyte, an iodide/triiodide electrolyte, a cobalt complex electrolyte, a lithium ion electrolyte, a simple salt, and a combination thereof. In an embodiment, the anode can be a photoanode (e.g., a photoanode including quantum dot sensitized $TiO_2$ on tin oxide).

In an embodiment, the electrode can include a surface having $MoS_2$ nano-petals. An embodiment of the $MoS_2$ nano-petals can include edges of the $MoS_2$ nano-petals are substantially perpendicular to the surface. In an embodiment, the $MoS_2$ nano-petals have a dimension selected from a length or width of about 300 to 400 nm.

In an embodiment, the method of making a structure including $MoS_2$ nano-petals can include: placing a Mo source (e.g., Mo foil) in a container including a sulfur precursor and a solvent (e.g., water) into a vessel and heating the vessel to form the $MoS_2$ nano-petals. In an embodiment, the heating can be conducted at about 177 to 240° C. for about 6 to 48 hours. In an embodiment, the sulfur precursor can include: thiourea, cysteamine, hydrazine hydrate-S, thioacetamide, cysteine, dodecanethiol, octanethiol, hexamethyldisilathiane, decyl-3-mercaptopropionate, elemental sulfur, sodium sulfide, sodium sulfate, and a combination thereof.

Other devices, methods, features, and advantages will be, or become, apparent to one with skill in the art upon examination of the following drawings and detailed description. It is intended that all such additional devices, methods, features, and advantages be included within this description, be within the scope of the present disclosure, and be protected by the accompanying claims.

BRIEF DESCRIPTION OF THE DRAWINGS

Many aspects of this disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
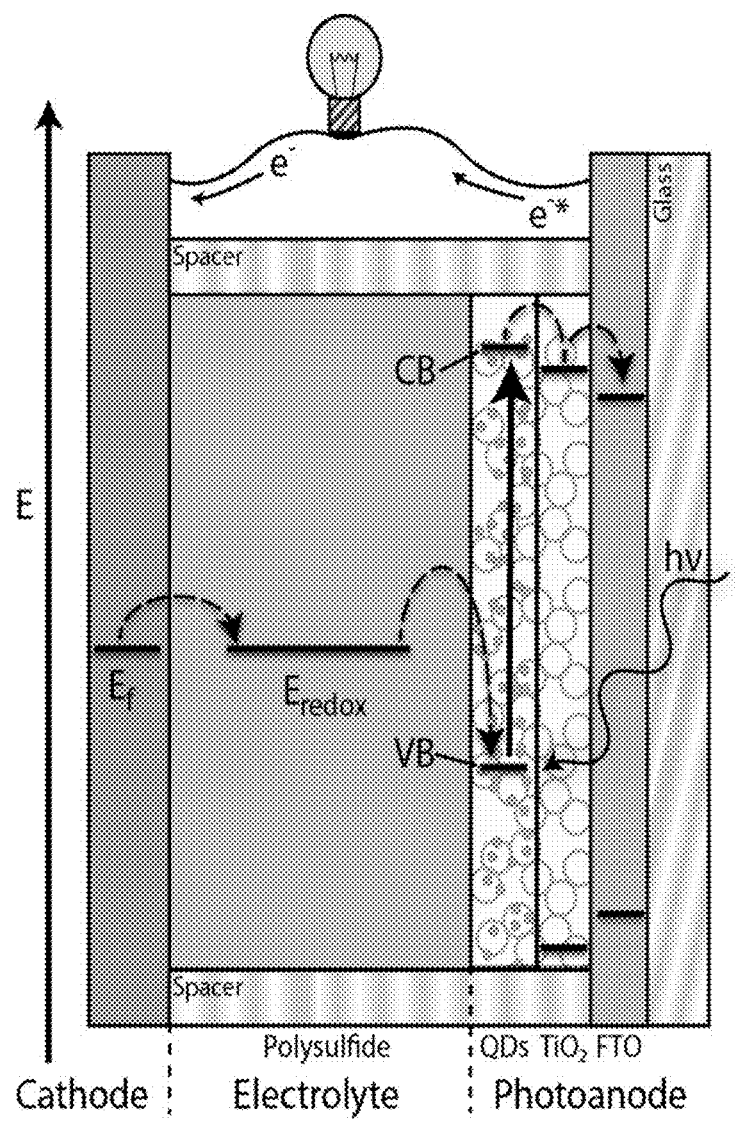
FIG. 1 illustrates a typical QDSSC overlaid with relative electron energetics (not to scale). At the photoanode, photons with sufficient energy (hv) will strike the QD, exciting an electron ($e^-$) from the valence band (VB) to the conduction band (CB). The excited electron ($e^{-*}$) will conduct by traveling to $TiO_2$ CB then the Fluorine Tin Oxide (FTO) Electrons travel out of the photoanode, do work, and return to the cell via the cathode. The cathode, in which the Fermi level ($E_f$) equalizes to the redox potential ($E_{redox}$) of the electrolyte, reduces the electrolyte, which carries negative charge to the photo-generated hole in the QD.

This disclosure is not limited to particular embodiments described, and as such may, of course, vary. The terminology used herein serves the purpose of describing particular embodiments only, and is not intended to be limiting, since the scope of the present disclosure will be limited only by the appended claims.

Where a range of values is provided, each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Embodiments of the present disclosure will employ, unless otherwise indicated, techniques of material science, chemistry, and the like, which are within the skill of the art. Such techniques are explained fully in the literature.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing processes, dimensions, frequency ranges, applications, or the like, as such can vary. It is also to be understood that the terminology used herein is for purposes of describing particular embodiments only, and is not intended to be limiting. It is also possible in the present disclosure that steps can be executed in different sequence, where this is logically possible. It is also possible that the embodiments of the present disclosure can be applied to additional embodiments involving measurements beyond the examples described herein, which are not intended to be limiting. It is furthermore possible that the embodiments of the present disclosure can be combined or integrated with other measurement techniques beyond the examples described herein, which are not intended to be limiting.

It should be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Each of the applications and patents cited in this text, as well as each document or reference cited in each of the applications and patents (including during the prosecution of each issued patent; "application cited documents"), and each of the PCT and foreign applications or patents corresponding to and/or claiming priority from any of these applications and patents, and each of the documents cited or referenced in each of the application cited documents, are hereby expressly incorporated herein by reference. Further, documents or references cited in this text, in a Reference List before the claims, or in the text itself; and each of these documents or references ("herein cited references"), as well as each document or reference cited in each of the herein-cited references (including any manufacturer's specifications, instructions, etc.) are hereby expressly incorporated herein by reference.

Prior to describing the various embodiments, the following definitions are provided and should be used unless otherwise indicated.

Discussion

Embodiments of the present disclosure provide for electrodes, devices including electrodes, methods of making electrodes, and the like. In an embodiment, the electrode includes $MoS_2$, in particular, $MoS_2$ nanostructures (e.g., $MoS_2$ nano-petals). Embodiments of the present disclosure can be used in lithium ion batteries, quantum dot sensitized solar cells, dye sensitized solar cells, thin film photovoltaics, and the like. In particular, embodiments of the present disclosure can be used as a stable and active cathode in quantum dot sensitized solar cells. In addition, embodiments of the present disclosure can be used in the production of $H_2$ from water, hydrodesulphurization, a transistor material, photocatalysis, and lubrication.

In general, $MoS_2$ has a layered crystalline structure having edge sites where Mo atoms are exposed and face sites where S atoms are exposed. In an embodiment, the edge sites on the $MoS_2$ nano-petals are substantially perpendicular or perpendicular to the surface on which they are present. In an embodiment, the $MoS_2$ nanostructures are $MoS_2$ nano-petals that can be a continuous layer or a plurality of discrete layers on the surface having their edge sites substantially perpendicular or perpendicular to the surface on which they are present. Although not intending to be bound by theory, the exposed edge sites of the $MoS_2$ nanostructures can be catalytic sites (e.g., for $H_2$), so maximizing the number of exposed edge sites can be advantageous.

In an embodiment, an electrode includes $MoS_2$ nanostructures, specifically $MoS_2$ nano-petals on the surface of the electrode. In an embodiment, the $MoS_2$ nano-petals have one ore more dimensions (e.g., length and/or width) of about 300 to 400 nm. In particular, the $MoS_2$ nano-petal has dimensions (e.g., length and/or width) of about 100 to 200 nm. In an embodiment, the $MoS_2$ nano-petal can have a thickness of about 0.3 to 30 nm.

In an embodiment, the $MoS_2$ nano-petals can be formed directly onto a structure that can be used as an electrode or attached to the electrode and/or the $MoS_2$ nano-petals can be prepared separately and placed on the structure.

In an embodiment, the edge sites of the $MoS_2$ nano-petals can be substantially (e.g., about 80% or more, about 90% or more, or about 95% or more) perpendicular to the surface of the structure. In an embodiment, the structure can be grown from a Mo source such as Mo foil or another structure such as an evaporated Mo layer on an Au electrode, tin oxide electrode, or an evaporated Pt electrode. In instances where the $MoS_2$ nano-petals are formed on a structure that is not the Mo source, then a separate Mo source is present to provide a source of Mo. In an embodiment, about 10 to 100% of the portion of the electrode being used for a particular application (e.g., it is contemplated that a portion of the electrode may not be in contact with the reactants) can be covered by the $MoS_2$ nanostructures.

An exemplary embodiment of the present disclosure includes a device having the electrode including the $MoS_2$ nano-petals (referred to as "$MoS_2$ cathode"), an anode, and an electrolyte. In an embodiment, the nano-petal can be a continuous network of $MoS_2$ edges or can include discrete areas of $MoS_2$ edges that are not a continuous network.

In an embodiment, the electrolyte can be selected from a polysulfide electrolyte, an acidic electrolyte (e.g., perchloric acid, hydroiodic acid, nitric acid, sulfuric acid, bromic acid, etc.) or basic electrolyte (e.g., hydroxides, sodium amide, sodium hydride, etc.), an iodide/triiodide electrolyte, a cobalt complex electrolyte, a lithium ion electrolyte, simple salts, and a combination thereof. In an embodiment, simple salts can include an anion (e.g., chloride, fluoride, sulfate, nitrate, nitrite, phosphate, acetate, etc.) and a cation (e.g., sodium, potassium, magnesium, iron, calcium, ammonium, etc.) such as NaCl, KCl, LiCl, $CaCl_2$, or $Na_2SO_4$. In a specific embodiment, the electrolyte is a polysulfide solution. The polysulfide solution can be made by dissolving sodium sulfide and sulfur in water with a supporting electrolyte such as sodium hydroxide or potassium hydroxide, for example. Polysulfide is not limited to the solvent, presence or type of supporting electrolyte, or presence of both sulfur forms; as long as at least one sulfur form is present, polysulfide will be formed.

In an embodiment, the anode can include an anode that is appropriate for the desired application. In an embodiment, the anode can include quantum dot sensitized $TiO_2$ on tin oxide, dye-sensitized $TiO_2$ on tin oxide, a metal electrode, and a semiconductor thin film.

Another exemplary embodiment of the present disclosure includes a device having the $MoS_2$ cathode, a photoanode including quantum dots (or specifically, a photoanode including quantum dot sensitized $TiO_2$ on tin oxide), and an electrolyte (e.g., a polysulfide electrolyte) (See for example, FIG. 1 as described in the Example). In an embodiment, the electrolyte is placed between the $MoS_2$ cathode and the photoanode. In an embodiment, the device is a quantum dot sensitized solar cell. In general the quantum dot sensitized solar cell operates by absorbing a photon (hv) by the photoanode and the excited electron ($e^-$) is promoted from the valence to the conduction band, leaving a positively-charged hole ($h^+$). The $e^-$ is further conducted and used to do work. The $e^-$ returns to the $MoS_2$ cathode reducing the polysulfide electrolyte, which further carries $e^-$ to recombine with $h^+$ at the photoanode.

In an embodiment, the photoanode can include an anode that is appropriate for the desired application. In an embodiment, the photoanode can include quantum dot sensitized $TiO_2$ on tin oxide, dye-sensitized $TiO_2$ on tin oxide, or a semiconductor thin film. In an embodiment, the quantum dot can include a sulfide or selenide quantum dot such as CdS, CdSe, ZnS, PbS, and $Ag_2S$, $CuZnSnS_2$, $Cu_2S$, $CuInS_2$, and the like. In an embodiment, the electrolyte can include those as described herein. Additional details are provided in the Example.

In an embodiment, a structure including $MoS_2$ nano-petals can be made by placing a Mo source, such as a Mo foil, or another structure in a container including a sulfur precursor and a solvent into a vessel (e.g., PTFE container). In an embodiment, the solvent can be selected from water, ethylene glycol, acetonitrile, trioctylphosphine oxide, octadecene, oleic acid, hexadecylamine, and a combination thereof.

In an embodiment, the sulfur precursor can be selected from thiourea, cysteamine, hydrazine hydrate-S, thioacetamide, cysteine, dodecanethiol, octanethiol, hexamethyldisilathiane, decyl-3-mercaptopropionate, elemental sulfur, sodium sulfide, sodium sulfate, and a combination thereof. In an embodiment, the sulfur precursor can have a concentration of about 0.001 M to 1 M in the solvent. In an embodiment, the sulfur precursor can be thiourea, which can have a concentration of about 0.02 M to 0.18 M in the water.

In an embodiment, the Mo source can be a Mo foil, sodium molybdate, evaporated Mo on a substrate, Mo nanostructures, or a combination thereof. In an embodiment, the Mo source can be the structure that the $MoS_2$ nano-petals are formed on or the $MoS_2$ nano-petals can be formed on another structure. In an embodiment where the Mo source is a Mo foil, the Mo foil can have a thickness of about 0.25 mm; however, Mo foil having a larger thickness (e.g., 1 mm or more) can be used. The Mo foil can have a length and width appropriate for the particular application.

In an embodiment where the Mo source is Mo foil and the sulfur source is thiourea, the weight ratio of the Mo foil to thiourea can be about 2.55 to 20.4. In an embodiment, the ratio of thiourea to surface area of Mo foil to be reacted can be about 6 to 50 mg thiourea per $cm^2$ Mo foil surface area. Based on the foregoing ratios, the ratios can be adjusted for a different sulfur source and/or Mo source.

In an embodiment, the vessel can be heated to about 177 to 240° C. for about 6 to 48 hours to form the $MoS_2$ nano-petals on the surface of the Mo source (e.g., Mo foil) or other structure. In an embodiment the vessel can be heated in an oil bath, muffle furnace, oven, or the like.

After the vessel is heated, the $MoS_2$ nano-petals are formed on the Mo source or other structure. Once the Mo source or other structure, including the $MoS_2$ nano-petals is cooled, the Mo foil or other structure can be rinsed with water or other appropriate solvent to remove any remaining material. In an embodiment, the edge sites of the $MoS_2$ nano-petals can be substantially perpendicular to the surface of the structure.

EXAMPLE

Brief Introduction:

Quantum dot sensitized solar cells are in need of a highly active, stable, and inexpensive cathode material for practical devices. In this Example, we show a new, facile, hydrothermal preparation of nanostructured $MoS_2$. Grown directly from a planar Mo metal foil, the $MoS_2$ films have a petaled morphology that exposes a large number of catalytically active Mo edge sites, and are highly active and stable for the electrochemical reduction of water and aqueous polysulfide. We also present preliminary results of its performance in solar devices, demonstrating superior QDSSC efficiency and stability compared to the use of Pt cathodes.

Introduction:

Quantum dot sensitized solar cells have the potential to revolutionize solar energy conversion due to the large extinction coefficients and tunable band gaps of quantum dots;[1] efficiencies of over 5% have been achieved using this design.[2] Great strides are being made into developing new, more efficient absorber layers on the photoanode;[3] however, instability and poisoning of standard cathode materials are limiting champion cell performances and make it challenging to identify important characteristics of experimental photoanodes, ultimately hindering a commercially viable QDSSC technology.[4, 5] While QDSSC photoanodes are and have been extensively studied,[3] cathodes to improve cell characteristics have only just recently come under renewed investigation.[5-11]

The distinguishing quality of QDSSCs is that quantum dots (QDs)—typically metal chalcogenides such as CdSe or PbS—are the light-absorbing component instead of dyes or silicon. QDs are an attractive photoabsorber material because they have large absorption coefficients and their absorption onset in the visible region can be tuned based on their size and composition. In an exemplary QDSSC (FIG. 1), light is absorbed by QDs on the photoanode and the excited electron is shuttled through the transparent conducting oxide(s) while the remaining hole on the QD is reduced by the electrolyte. While many electrolytes have been attempted, the $S_n^{2-}/S^{2-}$ (polysulfide) redox system has proven the most effective so far because of its optimal redox potential, efficient hole extraction from the QDs, and ability to chemically stabilize QDs such as CdS, PbS, and $Ag_2S$.[4]

The cathode must be able to reduce the electrolyte to complete the circuit. The most common cathode used for evaluating QDSSCs is platinum, followed by gold and glassy carbon. However all are quickly poisoned by the polysulfide, resulting in significant drops in current. Thus, these materials require large overpotentials to operate, lowering solar cell efficiencies and making them unsuitable for long-term use in a device. Also, platinum is rare and expensive, so replacing it with an inexpensive, earth-abundant material is an admirable goal.

Semiconducting metal sulfides such as $Cu_2S$, PbS and CoS are highly catalytically active for polysulfide reduction, but early studies of these materials showed that they were not stable under operating conditions. Specifically, the PbS device dropped to 10% of its initial current density after two weeks and both $Cu_2S$ and CoS dissolved and migrated to deposit on the photoanode, causing the power conversion efficiency to drop significantly.[12] Very recently, cathode preparations based on supported nanoparticles of PbS and $Cu_2S$ have shown improved stability.[6, 9, 11]

Molybdenum(IV) sulfide ($MoS_2$) is a potential candidate as a highly stable and catalytically active cathode for polysulfide reduction. Lately, $MoS_2$ has been the subject of a flurry of research due to its layered structure and interesting properties as a two-dimensional material, similar to graphene.[13] $MoS_2$ is a potential component in field-effect transistors[14] and dye sensitized solar cells[15] as well as an intercalation host for lithium ion batteries.[16] However, its known catalytic activity is most relevant here as it has long been used as an industrial hydrodesulfurization (HDS) catalyst[17] and has been shown to be an electrocatalyst for the hydrogen evolution reaction (HER),[13] both of which showcase its potential as a stable catalyst for sulfur electrochemistry.

The electronic structure of $MoS_2$ provides electrochemical stability as a cathode because the valence and conduction bands are seated in relatively non-bonding orbitals, dominated by Mo 4d character.[18] This is in contrast to late transition metal sulfides such as the electrochemically unstable PbS, CoS and $Cu_2S$ where the valence and conduction bands are in strongly bonding and antibonding orbitals, respectively. When a current is passed through $MoS_2$ its bonding character is not expected to be greatly altered.[19] As a testament to the electronic structure, $MoS_2$ has shown remarkable stability under both photooxidative[20] and electrochemically reductive conditions.[21]

Figure 2:
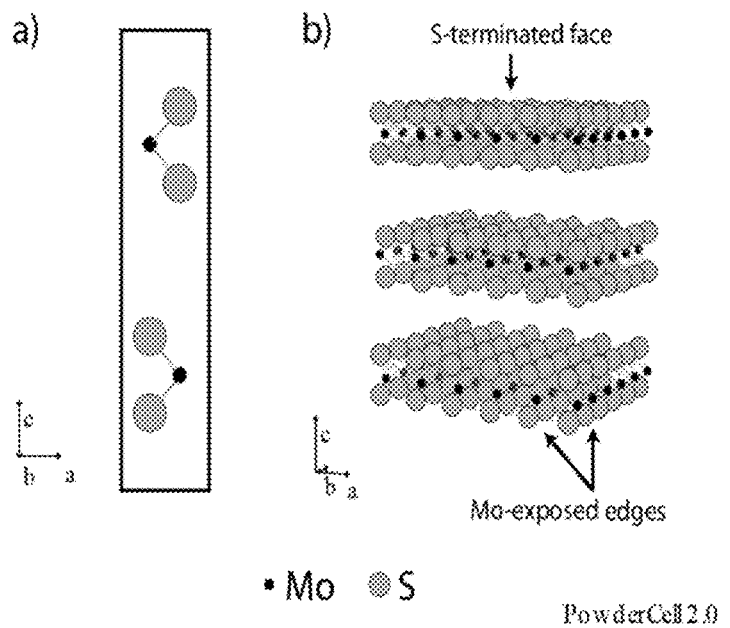
FIG. 2 illustrates the crystal structure of $MoS_2$: a) unit cell observed along the <010> axis; b) several $MoS_2$ layers with Mo-exposed edges and S-terminated faces labeled.

The unique crystal structure of $MoS_2$ can be exploited to optimize its catalytic properties. $MoS_2$ has a layered, hexagonal crystalline structure (FIG. 2). Sulfurs form pairs of close-packed layers with Mo atoms sandwiched between them forming a trilayer and each $MoS_2$ trilayer is separated by a van der Waals gap. It has been found that coordinately unsaturated crystallite edge sites where Mo is exposed—not the S-terminated faces—of $MoS_2$ are the catalytic sites for HDS[22, 23] and electrochemical HER.[24] Thus, maximizing the relative number of edge sites to facial sites has been shown to improve activity in electrochemical cells[25, 26] and HDS catalyst designs.[22]

Electrons preferentially conduct in-plane (a-, b-direction) and not through-plane (c-direction) in $MoS_2$.[27] Grain boundaries are also conducting[24] and energy states arising from surface defects such as edges, corners, and steps positively influence catalysis.[28] $MoS_2$ was investigated in the 1990s as a cathode material for polysulfide reduction but gave disappointingly low activity. This was most likely due to the material being produced in a planar fashion.[21] Thus an ideal electrocatalyst should also incorporate a directionality of the $MoS_2$ crystallites normal to a surface to promote conduction.

The research groups of Jaramillo and Cui have recently developed novel, highly controlled ways to expose the active edges of $MoS_2$ for HER cathodes, but these methods require several steps, expensive equipment, vacuum-assisted or inert atmosphere techniques, and hazardous chemicals.[25, 26] Previously, a hydrothermal route gave flower-like $MoS_2$ spheres presenting a large number of freestanding edge sites.[29] Thus, modifications of this type of reaction and material became our focus. Generally, hydrothermal syntheses are attractive synthetic routes, as high surface area hierarchical crystalline structures of the first row transition metal sulfides are common products,[30-32] and are typically experimentally facile, one-pot reactions which employ common stable reagents.

Here, we have developed a one-step, scalable, hydrothermal synthesis of a $MoS_2$ electrode that preferentially exposes $MoS_2$ active edges, incorporates a vertical directionality of the crystallites to promote electron conduction and can be used as a cathode for QDSSC and HER without further modification.

Figure 3:
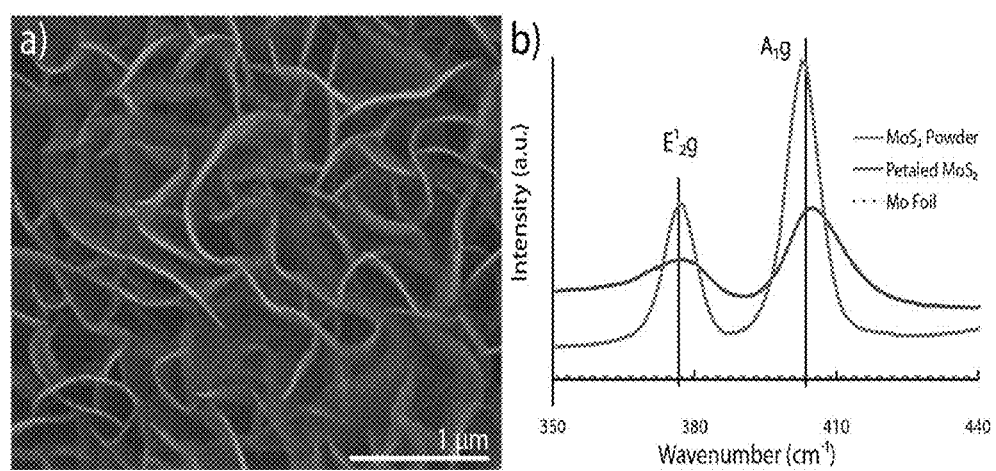
FIG. 3 illustrates the characterization of petaled $MoS_2$: a) SEM image of a typical petaled $MoS_2$ electrode; b) Raman spectra of $MoS_2$ powder, a petaled $MoS_2$ electrode, and a Mo foil control.
Figure 6:
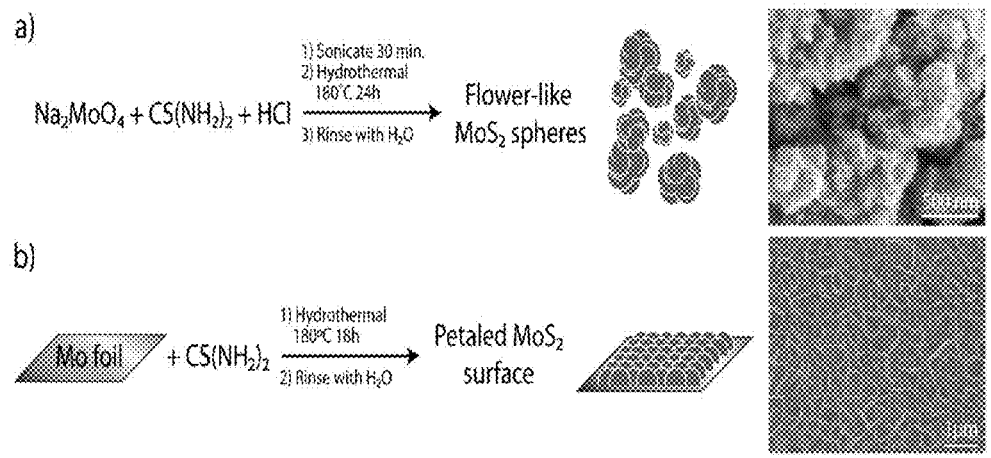
FIG. 6 illustrates Scheme 1, which shows the hydrothermal syntheses to produce nanostructured $MoS_2$: a) flower-like spheres and b) petaled $MoS_2$.
Figure 7:
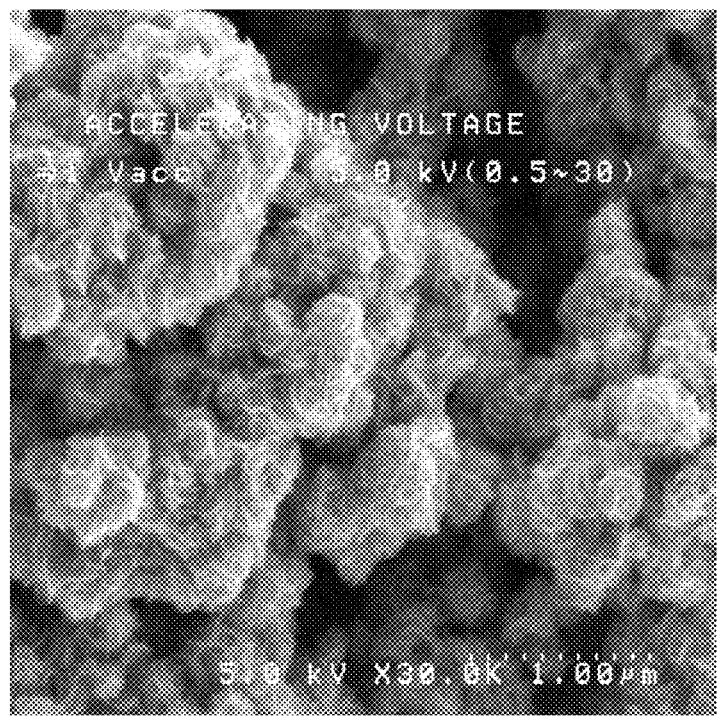
FIG. 7 illustrates the scanning electron micrograph of loose flower-like $MoS_2$ spheres.
Figure 8:
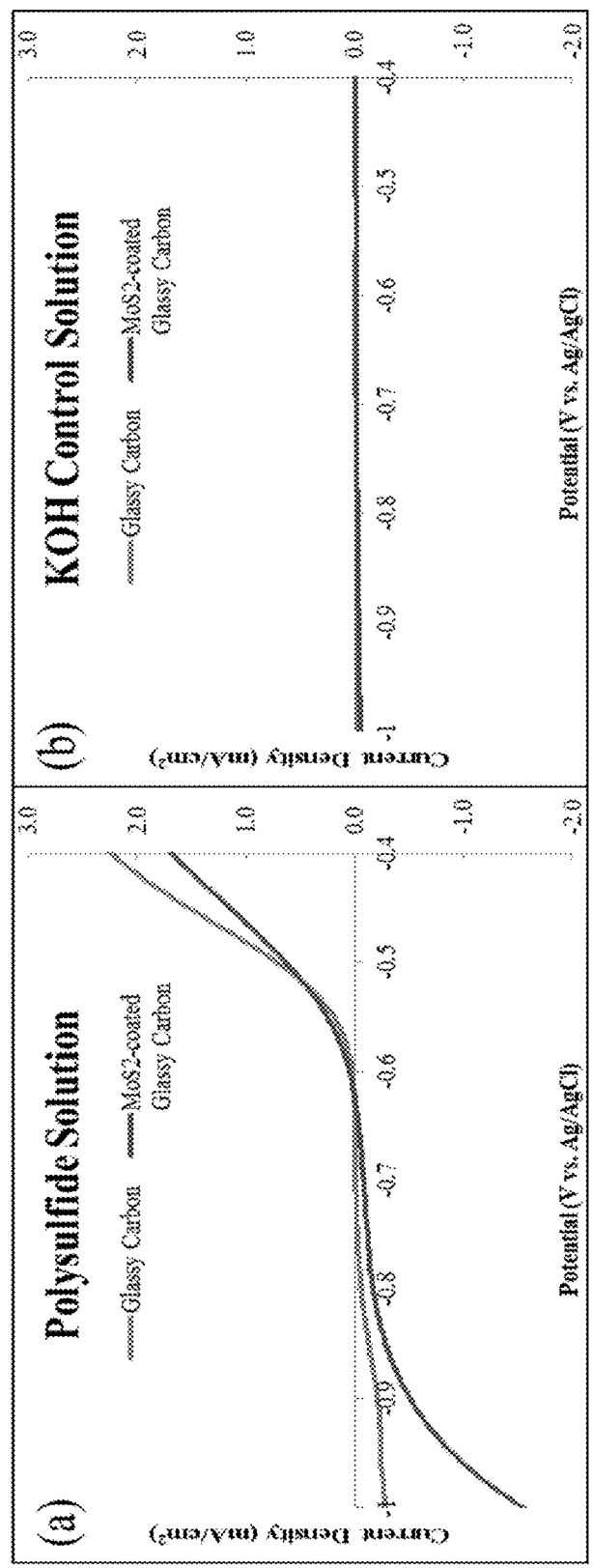
FIG. 8 illustrates the linear sweep voltammetry of glassy carbon and $MoS_2$ flower drop-cast onto glassy carbon in a) polysulfide and b) KOH solution.
Figure 9:
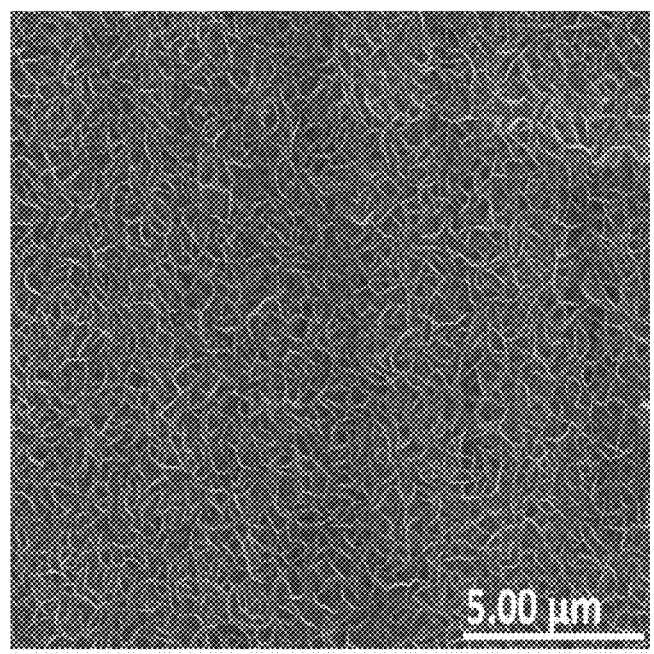
FIG. 9 illustrates lower magnification image of petaled $MoS_2$ to show uniformity of growth.

Results and Discussion:

Petaled $MoS_2$ Synthesis:

Flower-like $MoS_2$ spheres were prepared by a modified hydrothermal synthesis from the literature[29, 33] in which the spheres exhibited preferential edge growth perpendicular to the core (Scheme 1a (FIG. 6) and FIG. 7). Simply, sodium molybdate, thiourea, hydrochloric acid, and water were combined in a PTFE cup, assembled into a stainless steel autoclave and heated at 180° C. for 24 h (Scheme 1a). When drop-cast onto a glassy carbon electrode, these loose spheres improved the current density achieved by glassy carbon alone for polysulfide reduction (see FIG. 8). In order to adapt this material for applications requiring flat electrodes and improve conductivity to a metallic contact, the $MoS_2$ flower structures needed to be grown uniformly from a conducting surface. The Xie group demonstrated that hollow cubes of $MoS_2$ petals could be hydrothermally grown from a Mo-containing insoluble intermediate template structure.[34-36] We adapted this methodology by using molybdenum foil (or an alternative Mo source) as the insoluble Mo-containing template material in the hydrothermal reaction (Scheme 1b). SEM (Scheme 1b and FIG. 3a) showed the product to be a uniform layer of $MoS_2$ petals aligned normal to the Mo foil with a high number of edges exposed—a nearly ideal result.

Raman spectroscopy was used to confirm the presence of $MoS_2$ (FIG. 3b) which exhibits two large characteristic peaks at 376 and 403 $cm^{-1}$, corresponding to the $E_{2g}^1$ symmetric in-plane and $A_{1g}$ out-of-plane S—Mo—S stretching, respectively.[37] The Raman peaks of the petaled MoS$_2$ electrode align well with MoS$_2$ powder (Aldrich), but are slightly offset, especially in the case of the A$_{1g}$ mode, which is most likely because fewer bundled MoS$_2$ trilayers are being excited by the laser.[38-40] A Raman spectrum of the Mo foil shows that it does not contribute to the Raman signal of MoS$_2$ at these wavenumbers.

Figure 4:
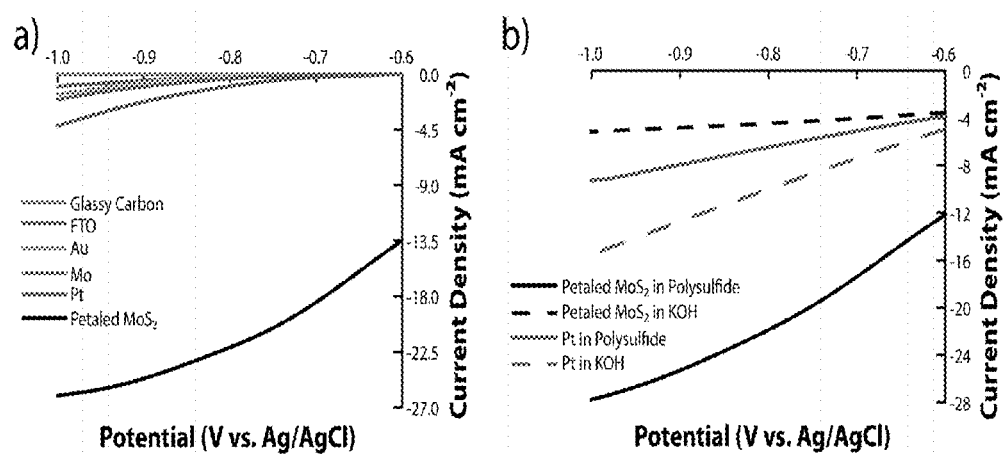
FIG. 4 illustrates a) Linear sweep voltammetry of various electrode materials in polysulfide solution: petaled $MoS_2$ electrode, high surface area Pt, Mo, Au, FTO, and glassy carbon. b) Linear sweep voltammetry of petaled $MoS_2$ and Pt electrode materials in polysulfide and KOH control solutions.

Electrochemical Characterization:

Evaluation of the petaled MoS$_2$ electrochemical performance was carried out via linear sweep voltammetry (LSV) in 1M Na$_2$S, 0.1M S, 0.1M KOH polysulfide solution (FIG. 4a). LSV scans from −0.6 to −1 V show that much higher current densities can be achieved using petaled MoS$_2$ electrodes than many other common materials such as Pt, Au, glassy carbon, and fluorine-doped tin (IV) oxide (FTO). Mo foil did not perform nearly as well as petaled MoS$_2$ electrodes for reducing polysulfide so it can be concluded that the high performance of petaled MoS$_2$ does not originate from Mo foil. Not only does petaled MoS$_2$ achieve current densities at least six times higher than other common electrode materials, but it also achieves current densities suitable for practical devices of at least 10-20 mA cm$^{-2}$ at less than 50 mV overpotential.[21] The E$_{redox}$ of the polysulfide solution used in these experiments is estimated to be −0.73 V vs. Ag/AgCl,[41] and at 0.05 V overpotential, the current density is 21 mA cm$^{-2}$, providing enough current to not hinder photoanode testing and later in practical devices.

The known catalytic reduction of water on MoS$_2$ is not a large contributor to the current density of petaled MoS$_2$ in polysulfide. When the control measurement was taken in 0.1 M KOH solution (FIG. 4b), where only water reduction will contribute to the measured current, the current density on the petaled MoS$_2$ electrode was much smaller than in polysulfide. Indeed, Pt outperformed petaled MoS$_2$ for water reduction. Furthermore, it is noted that the current density on high surface area Pt was smaller in polysulfide than in KOH. It is inferred from these observations that the high performance of petaled MoS$_2$ electrode toward polysulfide is not only the result of large surface area. The petaled MoS$_2$ catalytically reduces polysulfide, whereas Pt is not catalytic for this reaction but is instead poisoned in the polysulfide environment.

Figure 5:
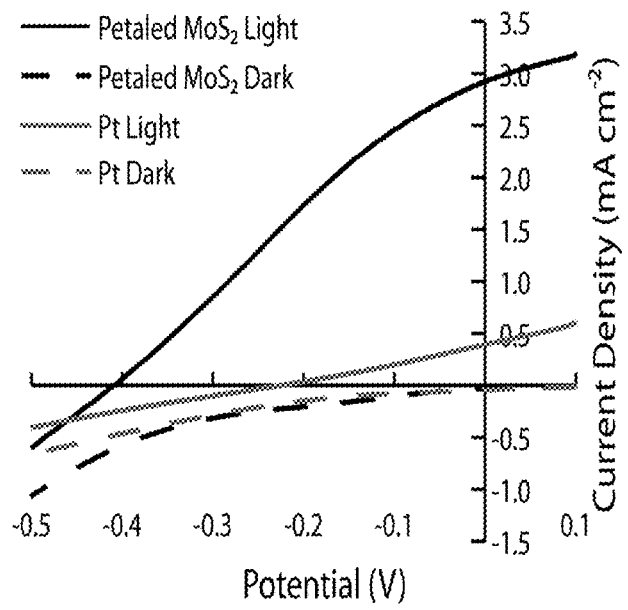
FIG. 5 illustrates current-potential curves in the dark and under illumination of devices using Pt or petaled $MoS_2$ cathode.

Experimental QDSSCs:

Experimental QDSSCs were prepared and tested to compare petaled MoS$_2$ and high surface area Pt as cathode materials. Photoanodes were prepared by applying TiO$_2$ paste (Ti-Nanoxide D, Solaronix) to a TiCl$_4$-treated[42, 43] FTO electrode via doctor blade technique, then annealing. CdS, CdSe, and ZnS QD layers were then deposited onto the TiO$_2$ via a combination of successive ionic layer adsorption and reaction (SILAR) and chemical bath deposition (CBD).[9] Devices were constructed by applying Surlyn® adhesive tape as a spacer to a QD-sensitized TiO$_2$/FTO photoanode, filling the active area with polysulfide electrolyte and clamping either a Pt or petaled MoS$_2$ cathode to the photoanode with binder clips. These devices were evaluated by attaching the working electrode clip to the photoanode and the counter and reference electrode clips to the cathode, then sweeping the potential from 0.1 to −0.5 V in the dark and under illumination (FIG. 5). The numeric values for cell characteristics including short-circuit current density (J$_{sc}$), open-circuit voltage (V$_{oc}$) and the calculated values for fill factor (FF) and efficiency (η) are listed in Table 1.

TABLE 1

Solar Cell Characteristics

| Cathode | J$_{sc}$ (mA cm$^{-2}$) | V$_{oc}$ (V) | FF | η | % J lost after 1 hour illumination |
|---|---|---|---|---|---|
| Petaled MoS$_2$ | 2.92 | 0.408 | 0.29 | 0.346% | 12.9% |
| Pt | 0.39 | 0.225 | 0.13 | 0.011% | 32.0% |

Comparing experimental QDSSC results, it is obvious that petaled MoS$_2$ outperforms Pt as a cathode material. In FIG. 5, when either device is not illuminated, the current becomes increasingly cathodic as the potential is swept to negative values. Under illumination, however, the curve is shifted up on the current axis so that a photovoltaic current is being produced. It is evident that the device employing petaled MoS$_2$ as a cathode produces much more photovoltaic current and in general has superior cell characteristics than the device employing a Pt cathode. The most pronounced improvement is in J$_{sc}$, where the current density on petaled MoS$_2$ is 7.5 times larger than with Pt. This is significant because cathode improvement is expected to make the largest improvement in current flowing through the device, as there is less resistance due to cathode poisoning. This provides further evidence that petaled MoS$_2$ can act catalytically in the electroreduction of polysulfide. Another consequence of the decreased series resistance contributed by petaled MoS$_2$ when compared to Pt is an improvement of FF, which indicates more ideal behavior of the device as a DC power source.[44] V$_{oc}$ is also significantly enhanced, which indicates improved interaction of the cathode Fermi level and electrolyte redox potential with the photoanode. Finally, the more than thirty-fold improvement of efficiency resulting from using petaled MoS$_2$ versus Pt is very promising for the utilization of this material in commercial solar cells.

Figure 10:
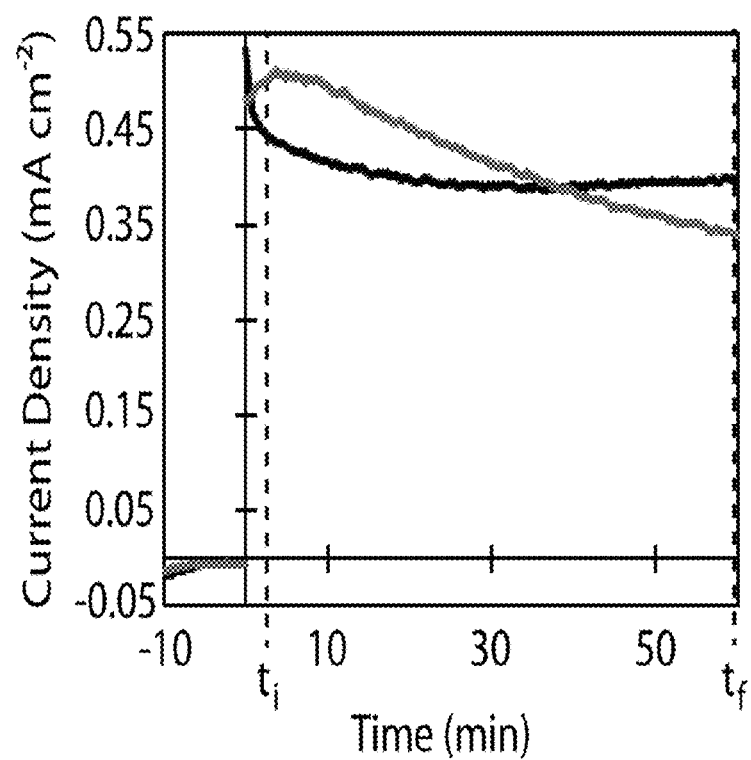
FIG. 10 illustrates the chronoamperometric study of QDSSC device using Pt (red line) or petaled $MoS_2$ (black line) as a cathode in the dark (negative time axis) and illuminated (positive time axis). Percent current density (% J) lost was calculated by dividing initial current density at $t_i$=100 s (when exponential decay ceased) by final current density at $t_f$=3600 s and multiplying by 100.

Chronoamperometry was used to estimate the stability of each cathode in a device by illuminating the device for one hour while monitoring current with zero potential applied. This experiment was designed to simulate the operation of a real-world, commercial solar panel. The percentage of initial current density, J, lost (Table 1, FIG. 10) after one hour illumination was about 2.5 times higher for the Pt cathode than the petaled MoS$_2$ cathode, which further indicates the continued poisoning of Pt by polysulfide and improved electrochemical stability of petaled MoS$_2$ during extended solar cell operation.

Conclusions

In conclusion, we have developed a facile hydrothermal synthesis to prepare petaled MoS$_2$, a highly active, stable, and inexpensive cathode material for polysulfide reduction in QDSSCs and HER. The synthesis produced a uniform layer of catalytically active edges grown perpendicular to the Mo precursor and substrate, which would be beneficial for a variety of applications requiring the catalytic capability of MoS$_2$, including HER and HDS. Electrochemical studies showed that petaled MoS$_2$ electrodes are active for HER and are more catalytically active for polysulfide reduction than Pt, far surpassing the current densities achieved with commonly used Pt electrodes. Quantum dot sensitized solar cells were constructed and tested, increasing greatly in efficiency simply by switching from a Pt cathode to a petaled MoS$_2$ cathode.

Experimental Section:

All chemicals were obtained from Sigma-Aldrich unless otherwise noted and all water was purified using Millipore® Direct-Q3 System to 18.2 MΩ·cm resistivity.

Petaled $MoS_2$ Synthesis:

Petaled $MoS_2$ was grown from Mo foil via a hydrothermal synthesis technique. Thiourea (1.847 mmol) (or alternative sulfur source as described above), 1.5×1.5 cm² Mo foil (99.95%, Strem) and 15.0 mL water (or alternative solvent as described above) were added to 23 mL PTFE cup with lid, assembled into a stainless steel autoclave (Parr Instrument Company) and suspended in a silicone oil bath. The bath was heated with to 180° C. and maintained at this temperature for 18 hours. After cooling to room temperature, autoclave was removed from the oil bath, disassembled and the product removed. The product was soaked in three separate rinses of water for at least 1 minute per soak.

Characterization of Petaled $MoS_2$:

Petaled $MoS_2$ electrodes were characterized using Raman spectroscopy (Thermo Scientific DXR Raman Microscope) to confirm presence of $MoS_2$. Electrodes were imaged using scanning electron microscopy (Hitachi S-4200).

FTO Preparation

All $SnO_2$:F (FTO) on glass pieces (TCO22-7, Solaronix) were cut to ~2×2 cm² and cleaned via sonication in an ultrasonic bath (VWR Symphony) for 10 minutes in each of the following solvents, consecutively: acetone, ethanol, water.

High Surface Area Pt Electrodes:

Platinum electrodes were prepared by the electron beam evaporation (Angstrom Engineering Å mod) of a 5-nm Cr adhesion layer followed by a ~100 nm Pt layer onto clean FTO/glass pieces. To increase the Pt surface area to make the electrodes more comparable to the high surface area petaled $MoS_2$ electrodes, a 5 mM $K_2PtCl_6$ suspension in isopropanol was dropped onto the surface of the e-beam evaporated Pt electrodes and allowed to dry, then annealed at 380° C. for 15 minutes.

Other Electrodes:

Other electrodes used for comparison were Au evaporated on Si (with Cr adhesion layer), Mo foil, FTO and glassy carbon (CH Instruments, Inc.). All electrodes except glassy carbon were cleaned before use according to FTO cleaning procedure described above. Glassy carbon electrodes were cleaned by polishing with moistened 0.05 μm alumina powder on a felt pad (CH Instruments, Inc.).

Electrolyte:

Polysulfide electrolyte solution (1M $Na_2S$, 0.1M S, 0.1M KOH) was prepared by combining $Na_2S \cdot 9H_2O$ (Strem), S, and KOH with water, heating to 60° C. under $N_2$ atmosphere until S dissolved and cooling to room temperature. 0.1M KOH control solution was made by dissolving KOH in $H_2O$. An alternative electrolyte an be used as described herein.

Electrochemical Measurements:

Electrochemistry (Gamry Series G 300 with PHE200 Software Package) was used to determine electrode characteristics. Electrochemical techniques employed were cyclic voltammetry, linear sweep voltammetry and chronoamperometry. Electrodes were evaluated individually by submerging in polysulfide solution along with a 1M Ag/AgCl reference electrode and Pt mesh counter electrode and measured using linear sweep voltammetry from −0.6 to −1 V at a scan rate of 0.1 V s$^{-1}$ and 2 mV voltage step. Cathodes were measured without respect to illumination, while photoanodes were measured in the dark and under illumination. Control measurements of petaled $MoS_2$ and high surface area Pt cathodes were carried out in 0.1M KOH solution. Loose flower-like $MoS_2$ spheres were electrochemically evaluated by drop-casting a suspension of the spheres in toluene onto a glassy carbon electrode and measuring current from −0.4 V to −1 V in polysulfide (1M $Na_2S$, 1M S, 1M KOH) and 1M KOH control solutions.

Photoanode Preparation:

Photoanodes were prepared by treating cleaned FTO/glass pieces with $TiCl_4$ (Strem) before and after a doctor blade application of $TiO_2$ paste by heating water to 70° C. in a large recrystallization dish, placing pieces in bottom of dish, and quickly adding $TiCl_4$ (final concentration: 40 mM) to the surface of the water. After 30 minutes, the FTO pieces were removed and rinsed with water and ethanol, and then dried. $TiO_2$ paste (Ti-Nanoxide D, Solaronix) was applied to FTO/glass pieces via doctor blade technique: several pieces were aligned in a row, Scotch® tape was applied along long edges to form a lane, excess $TiO_2$ paste was applied to one end, a razor blade was pressed onto same end of Scotch® tape and carefully dragged down the length of the pieces to evenly apply a $TiO_2$ paste layer approximately as thick as the Scotch® tape. After drying, $TiO_2$/FTO/glass pieces were annealed in a tube furnace in air at 250° C. for 30 minutes, then at 500° C. for 30 minutes. Annealing was repeated after the second $TiCl_4$ treatment of the photoanodes.

Successive ionic layer adsorption and reaction (SILAR) was then performed on $TiCl_4$-treated $TiO_2$/FTO/glass pieces to form a CdS seeding layer. Pieces were submerged in 0.1 M $Cd(ClO_4)_2$ (Strem) solution for 1 minute, rinsed with water, submerged in 0.1M $Na_2S$ solution for 1 minute, then rinsed; at least 4 of these cycles were repeated per photoanode. Chemical bath deposition was used to form the CdSe layer: 80 mM $Na_2SeSO_3$ solution was prepared by combining Se (80 mM, Strem) and $Na_2SO_3$ (120 mM, Strem) with 225 mL water in a glass bottle, sealing it, and heating it with stirring at 70° C. for 24 hours. Separate 75 mL solutions of 120 mM nitrilotriacetic acid, trisodium salt (NTA) and 80 mM $CdSO_4$ were also prepared and cooled along with $Na_2SeSO_3$ solution in an ice bath. A large recrystallization dish was suspended in the reservoir of a water circulator set to 10° C. Once this temperature was reached, photoanodes were placed in the bottom. The 80 mM $CdSO_4$ solution was slowly poured into the 120 mM NTA solution, then the resulting solution was slowly poured into the $Na_2SeSO_3$ solution and the final solution was slowly poured over the photoanodes. The dish was covered in plastic wrap, covered with the reservoir lid, and wrapped with aluminum foil to block incoming light. Deposition was allowed for 24 hours. After deposition, electrodes were rinsed with water and a protective ZnS layer was applied via SILAR: photoanodes were dipped in 0.1 M Zinc(II) acetate (Alfa Aesar) for 30 seconds, rinsed with water, dipped in 0.1 M $Na_2S$ for 30 seconds, rinsed again, dried, and stored in the dark. The back window and front FTO contact of each photoanode were cleaned with concentrated HCl (EMD) and rinsed thoroughly, then dried.

QDSSC Construction and Testing:

Solar devices were constructed by cutting a ~1.4×2 cm² piece of Surlyn® tape (McMaster-Carr) with a 0.9×0.8 cm² square cut out of the center. This was applied to the photoanode and all air bubbles pressed out. Then, the electrode was placed face-up on a custom-made outer mask made from black plastic (acrylonitrile butadiene styrene) such that the square cut out of the Surlyn® tape was centered over the outer mask window. This prevented scattered light from entering through the sides of the device. Excess polysulfide solution (~3 drops) was added to the square, and then the cathode was placed face-down over it and clamped down using binder clips and the excess electrolyte removed with a Kimwipe®. Devices were tested by positioning them in the center of and perpendicular to the light beam from the 500 W Hg(Xe) arc lamp (Newport Corporation) at a predetermined distance such that the light reaching the device was equal to 1 Sun intensity (1000 W m$^{-2}$). Then, the working electrode was attached to the photoanode FTO, and the counter and reference electrode leads were attached to the cathode. Linear sweep voltammetry scans from 0.1-(−0.5) V at 2 mV s scan rate were taken in the dark and under illumination. Device stability was assessed using chronoamperometry, where 0 V was applied for 10 minutes (dark) and 1 hour (illuminated).

REFERENCES, EACH OF WHICH IS INCORPORATED HEREIN BY REFERENCE

[1] W. W. Yu, L. H. Qu, W. Z. Guo, X. G. Peng, Chem. Mater. 2003, 15, 2854.
[2] L. Etgar, Materials 2013, 6, 445.
[3] H. K. Jun, M. A. Careem, A. K. Arof, Renew Sust Energ Rev 2013, 22, 148.
[4] S. Ruhle, M. Shalom, A. Zaban, Chemphyschem 2010, 11, 2290.
[5] M. S. Faber, K. Park, M. Caban-Acevedo, P. K. Santra, S. Jin, J. Phys. Chem. Lett. 2013, 4, 1843.
[6] J. G. Radich, R. Dwyer, P. V. Kamat, J. Phys. Chem. Lett. 2011, 2, 2453.
[7] G. Zhu, L. K. Pan, H. C. Sun, X. J. Liu, T. Lv, T. Lu, J. Yang, Z. Sun, Chemphyschem 2012, 13, 769.
[8] M. H. Yeh, C. P. Lee, C. Y. Chou, L. Y. Lin, H. Y. Wei, C. W. Chu, R. Vittal, K. C. Ho, Electrochim. Acta 2011, 57, 277.
[9] Z. Tachan, M. Shalom, I. Hod, S. Ruhle, S. Tirosh, A. Zaban, J. Phys. Chem. C 2011, 115, 6162.
[10] M. H. Deng, Q. X. Zhang, S. Q. Huang, D. M. Li, Y. H. Luo, Q. Shen, T. Toyoda, Q. B. Meng, Nano. Res. Lett. 2010, 5, 986.
[11] Z. X. Pan, K. Zhao, J. Wang, H. Zhang, Y. Y. Feng, X. H. Zhong, ACS Nano 2013, 7, 5215.
[12] G. Hodes, J. Manassen, D. Cahen, Journal of the Electrochemical Society 1980, 127, 544.
[13] M. Chhowalla, H. S. Shin, G. Eda, L. J. Li, K. P. Loh, H. Zhang, Nat. Chem. 2013, 5, 263.
[14] A. K. M. Newaz, D. Prasai, J. I. Ziegler, D. Caudel, S. Robinson, R. F. Haglund Jr, K. I. Bolotin, Solid State Commun. 2013, 155, 49.
[15] C. J. Liu, S. Y. Tai, S. W. Chou, Y. C. Yu, K. D. Chang, S. Wang, F. S. S. Chien, J. Y. Lin, T. W. Lin, J. Mater. Chem. 2012, 22, 21057.
[16] T. Sekine, C. Julien, I. Samaras, M. Jouanne, M. Balkanski, Materials Science and Engineering B-Solid State Materials for Advanced Technology 1989, 3, 153.
[17] H. Topsoe, B. S. Clausen, F. E. Massoth, in *Catalysis Science and Technology*, Vol. 11 (Eds: J. R. Anderson, M. Boudart), Springer, New York 1996, 114.
[18] A. Enyashin, S. Gemming, G. Seifert, Eur. Phys. J.-Spec. Top. 2007, 149, 103.
[19] J. P. Wilcoxon, P. P. Newcomer, G. A. Samara, J. Appl. Phys. 1997, 81, 7934.
[20] L. F. Schneemeyer, M. S. Wrighton, J. Am. Chem. Soc. 1979, 101, 6496.
[21] P. M. Lessner, F. R. Mclarnon, J. Winnick, E. J. Cairns, J. Appl. Electrochem. 1992, 22, 927.
[22] J. Bachelier, M. J. Tilliette, J. C. Duchet, D. Cornet, in *Catalysis Science and Technology*, Vol. 11 (Eds: J. R. Anderson, M. Boudart), Singer, New York 1996, 182.
[23] M. Daage, R. R. Chianelli, J. Catal. 1994, 149, 414.
[24] I. Chorkendorff, T. F. Jaramillo, K. P. Jorgensen, J. Bonde, J. H. Nielsen, S. Horch, Science 2007, 317, 100.
[25] J. Kibsgaard, Z. B. Chen, B. N. Reinecke, T. F. Jaramillo, Nat. Mater. 2012, 11, 963.
[26] D. S. Kong, H. T. Wang, J. J. Cha, M. Pasta, K. J. Koski, J. Yao, Y. Cui, Nano Lett. 2013, 13, 1341.
[27] M. Bouroushian, *Electrochemistry of the Metal Chalcogenides*, Springer, New York 2010.
[28] Z. Chen, A. J. Forman, T. F. Jaramillo, The Journal of Physical Chemistry C 2013, 117, 9713.
[29] W. Z. Huang, Z. D. Xu, R. Liu, X. F. Ye, Y. F. Zheng, Mater. Res. Bull. 2008, 43, 2799.
[30] F. Cao, W. Hu, L. Zhou, W. D. Shi, S. Y. Song, Y. Q. Lei, S. Wang, H. J. Zhang, Dalton T 2009, 9246.
[31] Z. G. Tan, Q. Zhu, X. Z. Guo, J. F. Zhang, W. Y. Wu, A. P. Liu, Acta Chim. Sinica 2011, 69, 2812.
[32] Q. H. Wang, L. F. Jiao, H. M. Du, W. X. Peng, Y. Han, D. W. Song, Y. C. Si, Y. J. Wang, H. T. Yuan, J. Mater. Chem. 2011, 21, 327.
[33] X. Y. Chen, H. L. Li, S. M. Wang, M. Yang, Y. X. Qi, Mater. Lett. 2012, 66, 22.
[34] C. Z. Wu, Y. Xie, J. Nanosci. Nanotech. 2008, 8, 6208.
[35] L. Ye, W. Guo, Y. Yang, Y. F. Du, Y. Xie, Chem. Mater. 2007, 19, 6331.
[36] L. N. Ye, C. Z. Wu, W. Guo, Y. Xie, Chem. Commun. 2006, 4738.
[37] P. A. Bertrand, Physical Review B 1991, 44, 5745.
[38] H. Li, Q. Zhang, C. C. R. Yap, B. K. Tay, T. H. T. Edwin, A. Olivier, D. Baillargeat, Adv. Funct. Mater. 2012, 22, 1385.
[39] Q. H. Wang, K. Kalantar-Zadeh, A. Kis, J. N. Coleman, M. S. Strano, Nat. Nanotechnol. 2012, 7, 699.
[40] C. Lee, H. Yan, L. E. Brus, T. F. Heinz, J. Hone, S. Ryu, ACS Nano 2010, 4, 2695.
[41] P. M. Lessner, F. R. Mclarnon, J. Winnick, E. J. Cairns, Journal of the Electrochemical Society 1993, 140, 1847.
[42] J. Kim, H. Choi, C. Nahm, C. Kim, S. Nam, S. Kang, D. R. Jung, J. I. Kim, J. Kang, B. Park, J. Power Sources 2012, 220, 108.
[43] L. Vesce, R. Riccitelli, G. Soscia, T. M. Brown, A. Di Carlo, A. Reale, J. Non-Cryst. Solids 2010, 356, 1958.
[44] S. Ashok, K. P. Pande, Sol Cells 1985, 14, 61.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to the measuring technique and the numerical value. In addition, the phrase "about 'x' to 'y'" includes "about 'x' to about 'y'".

While only a few embodiments of the present disclosure have been shown and described herein, it will become apparent to those skilled in the art that various modifications and changes can be made in the present disclosure without departing from the spirit and scope of the present disclosure.

All such modification and changes coming within the scope of the appended claims are intended to be carried out thereby.

We claim at least the following:

1. An electrode, comprising:
   $MoS_2$ nano-petals grown from a surface of the electrode, wherein about 80% or more of the $MoS_2$ nano-petals have edges that are grown perpendicular to the surface of the electrode.

2. The electrode of claim 1, wherein the $MoS_2$ nano-petals have a dimension selected from a length or width of about 300 to 400 nm.

3. The electrode of claim 1, wherein the $MoS_2$ nano-petals have a dimension selected from a length or width of about 100 to 200 nm.

4. The electrode of claim 1, wherein the $MoS_2$ nano-petals have a dimension selected from a length or width of about 100 to 200 nm, wherein the $MoS_2$ nano-petals have a thickness of about 0.3 to 30 nm.

5. The electrode of claim 1, wherein the $MoS_2$ nano-petals have a dimension selected from a length or width of about 300 to 400 nm, wherein the $MoS_2$ nano-petals have a thickness of about 0.3 to 30 nm.

* * * * *

UNITED STATES PATENT AND TRADEMARK OFFICE
CERTIFICATE OF CORRECTION

| | | |
|---|---|---|
| PATENT NO. | : 9,496,094 B2 | Page 1 of 1 |
| APPLICATION NO. | : 14/187371 | |
| DATED | : November 15, 2016 | |
| INVENTOR(S) | : Janet Macdonald and Shane Thomas Finn | |

It is certified that error appears in the above-identified patent and that said Letters Patent is hereby corrected as shown below:

On the Title Page

(73) Assignee: change "VANDERBILT UNIVERSITY CENTER FOR TECHNOLOGY TRANSFER AND COMMERCIALIZATION" to -- VANDERBILT UNIVERSITY --.

Signed and Sealed this
Twenty-ninth Day of August, 2017

Joseph Matal
*Performing the Functions and Duties of the*
*Under Secretary of Commerce for Intellectual Property and*
*Director of the United States Patent and Trademark Office*